United States Patent [19]

Hehl

[11] Patent Number: 5,478,231
[45] Date of Patent: Dec. 26, 1995

[54] INJECTION MOLDING MACHINE FOR PROCESSING SYNTHETIC MATERIALS

[76] Inventor: Karl Hehl, Arthur-Hehl-Str. 32, D-72290 Lossburg, Germany

[21] Appl. No.: 249,218

[22] Filed: May 26, 1994

[30] Foreign Application Priority Data

May 29, 1993 [DE] Germany .............. 43 17 997.5
Jun. 19, 1993 [DE] Germany .............. 43 20 366.3

[51] Int. Cl.[6] ................................. B29C 45/66
[52] U.S. Cl. ............ 425/589; 425/451.5; 425/451.7; 425/592
[58] Field of Search .................. 425/589, 590, 425/592, 593, 595, 451.7, 183, 184, 185, 190, 451.5

[56] References Cited

U.S. PATENT DOCUMENTS 4,222,731  9/1980  Enrietti et al. .
4,878,828  11/1989  Wollschlager et al. ............. 425/589

FOREIGN PATENT DOCUMENTS 0585630    3/1994   European Pat. Off. .
1109356    6/1961   Germany .
3924182    5/1990   Germany .
2012206    7/1979   United Kingdom .
94/17977   8/1994   WIPO .

OTHER PUBLICATIONS

Patent Abstracts of Japan, vol. 8, No. 284 (M–348) (1721) Dec. 26, 1984 & JP-A-59-152832.

Patent Abstract of Japan, vol. 7, No. 68 (M–201), Mar. 19, 1983 & JP-A-57-209799.

Primary Examiner—Tim Heitbrink
Attorney, Agent, or Firm—Spencer, Frank & Schneider

[57] ABSTRACT

In an injection molding machine for processing synthetic materials. The stationary mold carrier and the movable mold carrier are in connection by levers arranged transversally with respect to the closing direction. Mentioned levers at turn are arranged in different distances from the injection axis. The connecting spars and the levers constitute a framing, at which at least one closing device for closing the mold and for applying the closing forces is supported.

14 Claims, 18 Drawing Sheets

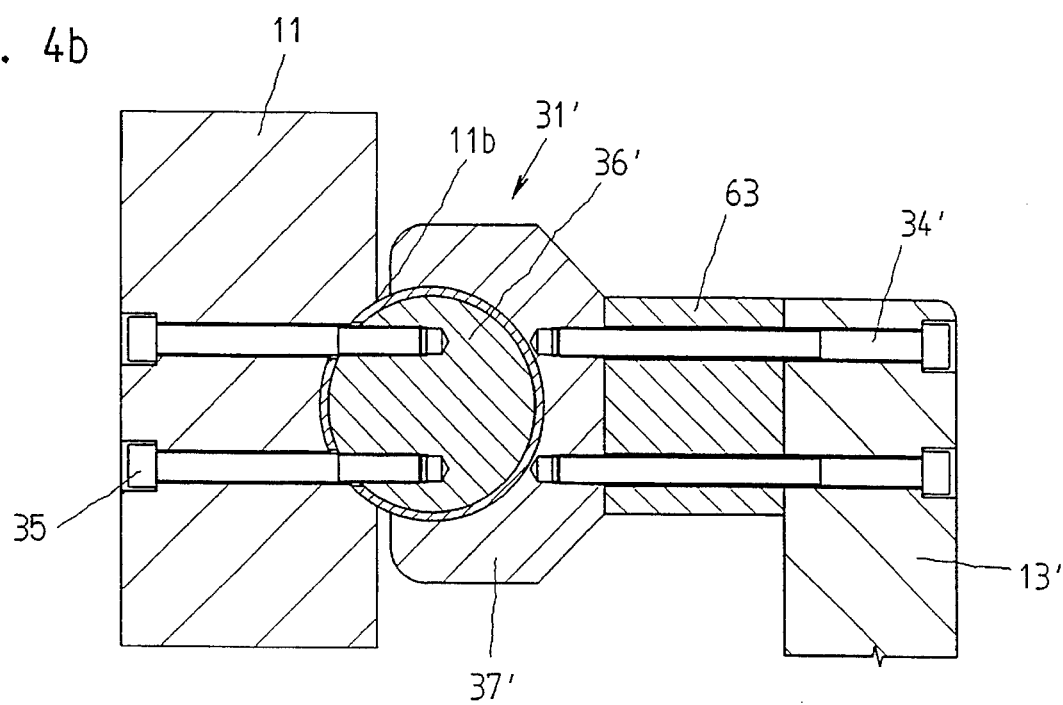

5,478,231

INJECTION MOLDING MACHINE FOR PROCESSING SYNTHETIC MATERIALS

BACKGROUND OF THE INVENTION

1. Field of the Invention

This invention relates to an injection molding machine for processing synthetic materials provided with a mold closing unit comprising a stationary mold carrier and a movable mold carrier, arranged to receive the parts of a mold between them and interconnected by force transmitting means, comprising at least two levers, substantially arranged transversally with respect to the closing direction. The levers are interconnected by connecting means, which are arranged at different distances from an injection axis, laid through the coupling points of the levers and nearly parallel with respect to the closing direction. Furthermore this arrangement comprises a closing device adapted to transfer the movable mold carrier in and out of a closed position with the stationary mold carrier and a device for applying the closing forces.

2. Description of the Prior Art

An injection molding machine of this type is known from U.S Pat. No. 4,222,731. In this machine the stationary mold carrier and the movable mold carrier are interconnected by a lever system, which comprises two levers in a vertical position and one horizontally disposed longitudinal beam, which is jointedly connected with the levers. Opposite to the longitudinal beam a further joining element is arranged in a larger distance from the closing axis, which is constituted by a piston-cylinder assembly. A lever provided for closing the mold, which is coupled at the movable mold carrier axially moves the movable mold carrier in a closing direction via a second piston-cylinder assembly. After the mold has been closed, the piston-cylinder assembly arranged at the lower end of the levers is used for applying the closing force. This way the object to create a mold clamping space without beams is certainly accomplished, however, forces are led into the machine base via the stationary mold carrier and the coupling of the second piston-cylinder assembly in the vicinity of the mold clamping space in such a way, that the machine base is subject to deformations, which cause inaccuracies during the mold closure and thus inexact injected pieces. Since the injection molding unit is displaced together with the movable mold carrier, the deformations are additionally reinforced. The application of a hydraulically driven piston-cylinder assembly causes problems with respect to the supply with hydraulic medium due to its movable arrangement.

Furthermore German Patent 39 24 182 discloses a blow molding machine, in which a force framing surrounds the two mold parts. When a drive for applying the closing forces is actuated, the whole framing is moved and the two movably supported mold carriers are directed against each other by a synchronizing device. In so far a decoupling between force transmission and guidance is effected, however, no reproducible mold closure can be obtained due to the movability of both mold carriers. Reproducible mold closure is required for the injection molding, since the forces occurring are essentially higher than those occurring during blow molding.

SUMMARY OF THE INVENTION

It is an object of the invention to provide an injection molding machine for processing synthetic materials, which is of the kind described first hereinbefore, in that the occuring forces are largely and reliably deviated outside the mold clamping space and that at the same time meets the highest requirements with respect to precision during the mold closure.

That object is accomplished in accordance with the invention in that first and second connecting means and the levers together and on its own constitute a framing, at which the closing device for transfer of the movable mold carrier is supported and in that a device for applying the closing force engages into at least one lever, thus modifying the angle ratio between the first connecting means and the lever and between the second connecting means and the lever.

The stationary mold carrier constitutes the connection point between the mold closing unit and the remaining injection molding machine. The mentioned stationary mold carrier is connected with the movable mold carrier by force transmitting means, at which one or more closing devices are supported in such a way that an additional introduction of forces into the machine base is largely avoided. Above all the built up closing forces are deviated via the deformable force transmitting means, without influencing the position of the mold carriers. Peripheral devices, such as handling- and removal devices, mounted at the machine base, are not affected by the deformations so that an exact approach of the depositing points is reproducably possible in this area as well. The horizontal nozzle zero point remains at zero even under maximum locking pressure, since the nozzle zero point is independent from the deformations by the contact at the stationary mold carrier. The mold tentering space is freely accessible due to the deviation of the forces via the force transmitting means. Since the electromechanical device for applying the closing forces engages the framing constituted by the connecting element and the lever, even the deformations arising by this are of no importance.

According to a preferred feature first connecting means arranged in the vicinity of the closing axis are tension spars when the closing force is applied and second connecting means arranged at a second distance to the closing axis, which is greater than the first distance are pressure spars when the closing force is applied. The device for applying the closing force is arranged in an area of coupling of the pressure spar to the lever and is electromechanically driven. In such an arrangement the bearings of the tension- and pressure spars can be formed rigidly or jointedly corresponding to the calculated deformations without affecting the force transmitting function. At the same time this makes it possible to dispose of the tension spars as guides for the movable mold carrier in spite of the deformations to which they are subject to. If necessary, the tension spars can also be applied for a supporting element for the closing device, since the deformations they are subject to are essentially longitudinal ones, which do not afect the guiding function. If the tension- and pressure spars are dimensioned correspondingly, they can be completely located inside the machine base. This fact strengthens the user requirements that a freely accessible mold clamping space be available, so that larger mold dimensions can be achieved.

BRIEF DESCRIPTION OF THE DRAWING

FIG. 4a,4b are alternative embodiments of the linked bearing of FIG. 4, without and with washer piece.

DETAILED DESCRIPTION OF THE PREFERRED EMBODIMENTS

Figure 1:
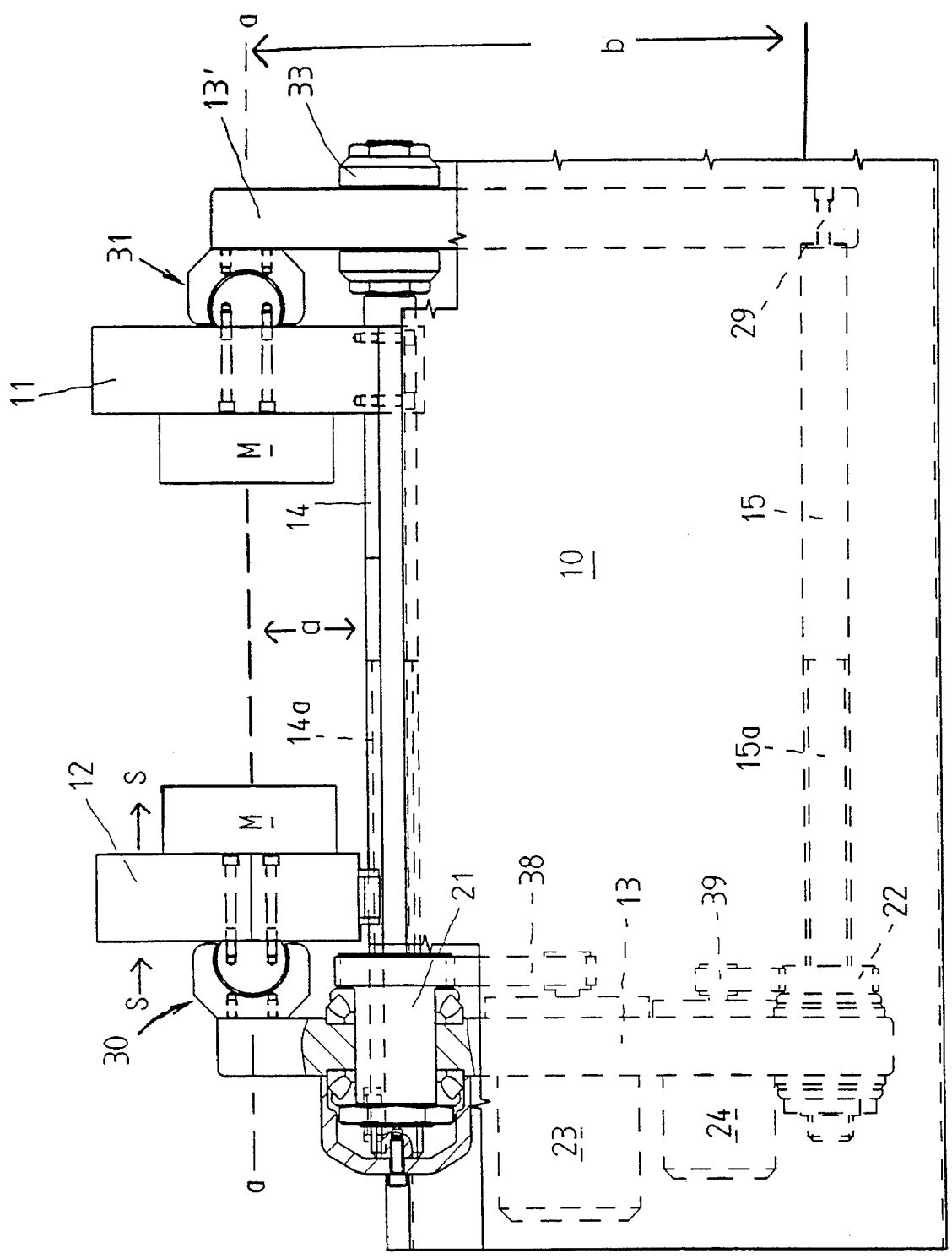
FIG. 1 shows in side elevation, the mold closing unit of the injection molding machine for processing synthetic materials arranged on a machine base.

The invention will now be described in more detail by example with reference to the embodiments shown in the Figures. It should be kept in mind that the following described embodiments are only presented by way of example and should not necessarily be construed as limiting the inventive concept to any particular physical configuration.

The injection molding machine for processing synthetic materials is provided with a mold closing unit comprising a stationary mold carrier 11 and a movable mold carrier 12, arranged to receive the parts of a mold M (in FIG. 1) between them. Both mold carriers are interconnected by force transmitting means. The movable mold carrier 12 is transferable in and out of a closed position with the stationary mold carrier via a closing device S. The levers 13, 13' are transversally arranged, substantially vertical, with respect to the closing direction s—s. Spar-type first and second connecting means, which interconnect the levers, are provided substantially horizontal, in different first and second distances a,b from a closing axis a—a, laid through the coupling points of the levers 13, 13' and nearly parallel with respect to the closing direction. The connecting means together with the levers 13, 13' constitute a force framing and thus force transmitting means. The closing device S and the device for applying the closing forces engage in the force transmitting means without loading the machine base or, as in the fifth and sixth embodiment, loading the machine base only insignificantly. Since both devices are decoupled one from the other, they can be adequately dimensioned for their respective task.

In the examples shown in the FIGS. 1–13 the mold closing unit is in rigid connection with the machine base 10 only via the stationary mold carrier 11, which is there fixed by screws 28. Otherwise the mold closing unit is axially freely movable into the closing direction s—s. The mold carriers 11, 12 are at least indirectly jointedly supported at the force transmitting means, that is at the lever systems, so that deformations can be kept away from the mold M. The jointed bearing is effected by the joints 30, 31. In such an arrangement the principle followed is to deviate the deformations via a deformation element, which has no influence on further machine parts, whereas the closing forces are applied unimpeded in the closing direction.

The connecting means are spars. First connecting means are arranged in the vicinity of the closing axis a—a, when the closing force is applied, and are tension spars 14 located in the first distance a. Second connecting means are arranged more distantly from the closing axis a—a and are pressure spars 15. In the embodiments shown in the FIGS. 1–13 at least two force framings comprising each two levers 13, 13', one tension spar 14 and one pressure spar 15, are provided respectively, however, other executions are also possible. The essential point is to constitute a closed force framing, at and in which the closing unit S engages. The first distance a of the tension spars 14 and the second distance b of the pressure spars 15 from the injection axis a—a influences the forces to be transmitted by these spars according to the lever principle. User requirements and esthetic reasons might plead for a transfer of the tension spars into an area which is covered by the machine base 10.

Figure 16:
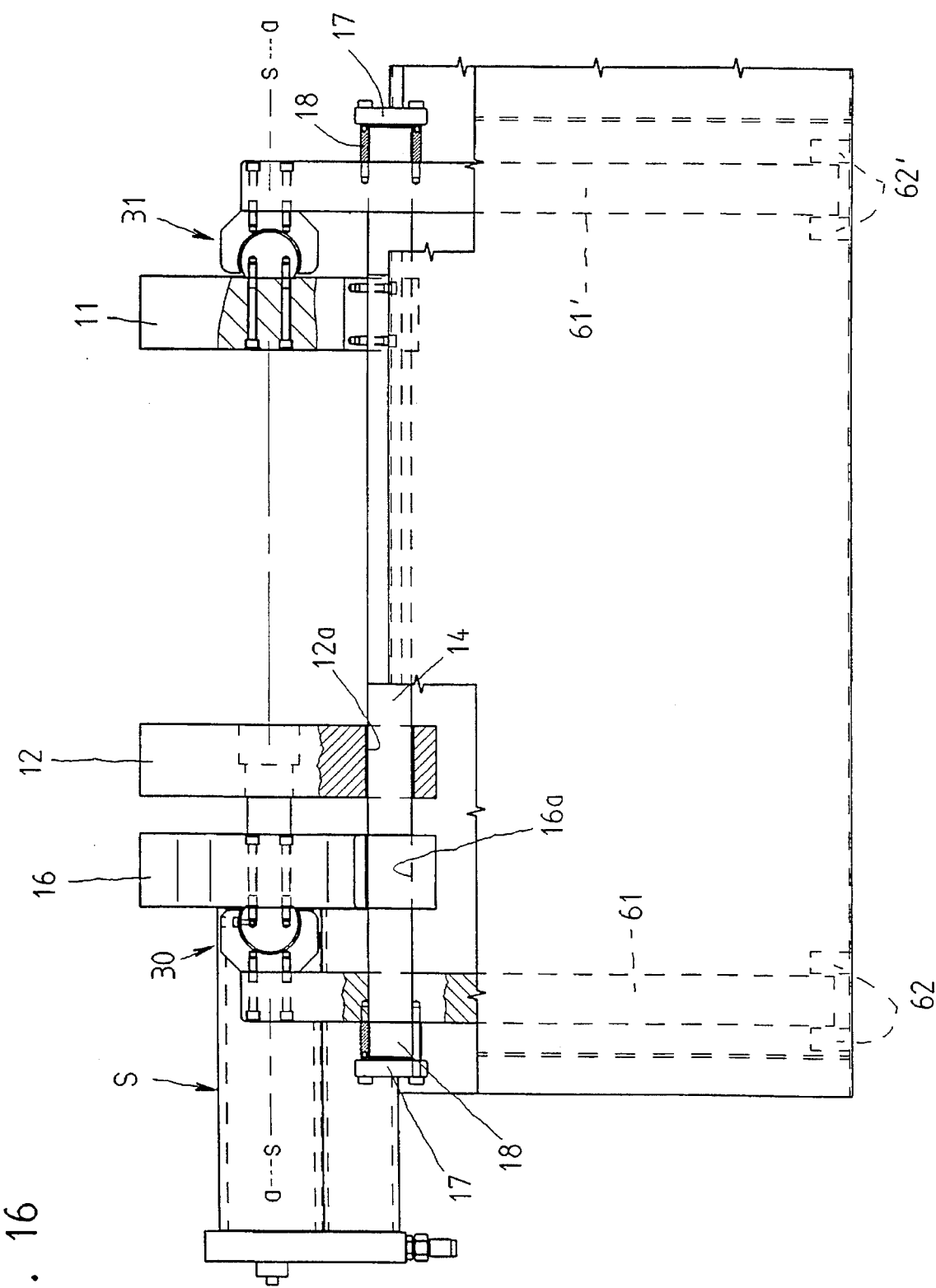
FIG. 16 is a view according to FIG. 1 in a fifth embodiment, wherein the levers are bedded in a pair of guides of the machine base.

In FIG. 1 the tension spars 14 are jointedly connected with the levers, whereas the pressure spar 15 at its one end is fixedly connected with the lever 13' by the screws 29. The coupling of the tension spars might, according to the FIGS. 6, 16, also be made in such a way, that the tension spars 14 do not only penetrate the stationary mold carrier 11, the movable mold carrier 12 and a supporting element 16 for the closing unit S, but also the levers 13, 13'. Tension spars 14 are fixedly supported at their ends in retaining plates 17 which again lead the forces into the levers by the retaining plates 17 and nuts 18. The closing unit can be driven for example electrically, pneumatically or hydraulically. In order to allow the tension spars 14 to penetrate through the mold carriers 11, 12 and the supporting element 16, these elements are provided with recesses 11a, 12a, 16a. Since the tension spars 14 essentially are only subject to longitudinal deformations, they may also serve as guidance for the supporting element 16 (FIG. 16) and the movable mold carrier 12, in spite of their force transmitting function. Of course, other guidance types as for example guide beads on the machine base 10, are possible.

Figure 4:
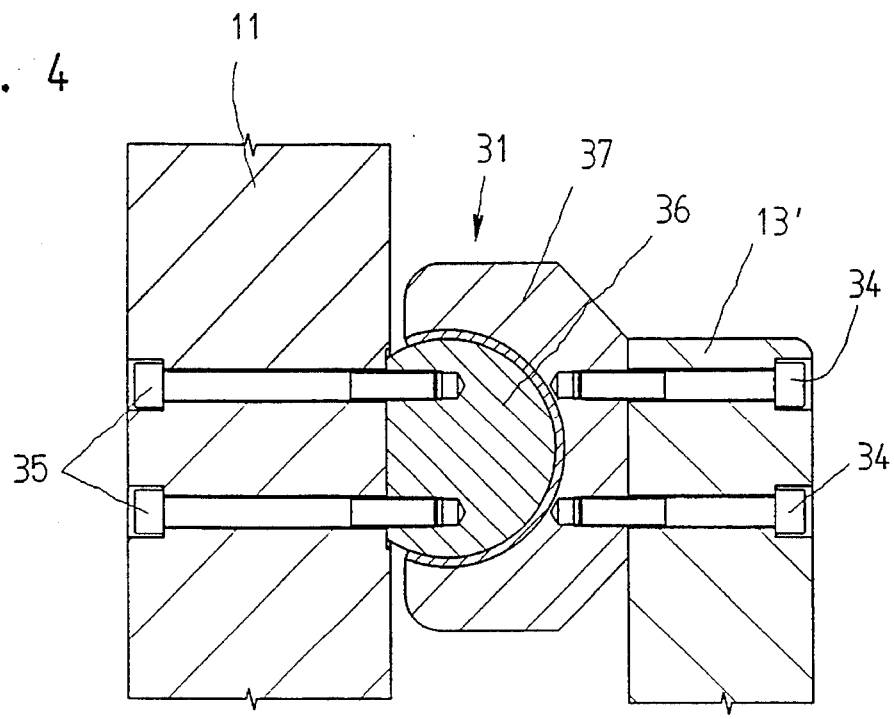
FIG. 4 is an enlarged detail of FIG. 1 in the area of the linked bearing of the stationary mold carrier.
Figure 4A:
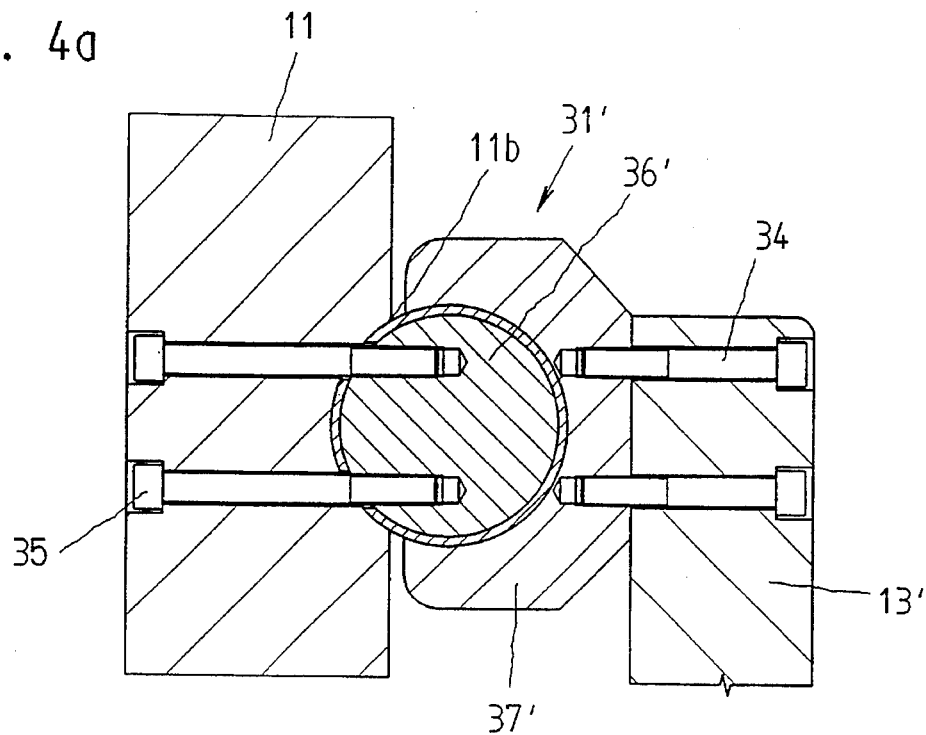

FIGS. 4, 4a show bearings for the joint 31, 31', which is formed in such a way that both pressure- and tensile forces are transferable. The joints ensure plane-parallelism of the mold carriers, when the levers 13' are in an inclined position. The joint 31, 31' comprises a hinge bolt 36, 36' fixed at the stationary mold carrier 11 by studs 35, and a socket joint 37, 37' connected with the lever 13' by studs 34. A reversion of the arrangement is possible. FIG. 4 and FIG. 4a differ from each other in that the hinge bolt 36' in FIG. 4a catches into a recess 11b of the stationary mold carrier 11, thus ensuring a vertical fixing of the lever 13'. The arrangement of the joints behind the mold carriers, seen from the mold, reduces the bending stress of the mold carriers. Since the hinge bolt 36, 36' and the socket joint 37, 37' are exchangeable, the most strained joint parts can be easily exchanged and thus wear at the levers and the mold carriers is avoided. Moreover, if necessary, it is also possible to provide longer studs 34', 35', which penetrate washer pieces 63, so that the clamping dimension of the mold can be easily changed, in order to consider smaller mold dimensions.

Figure 5:
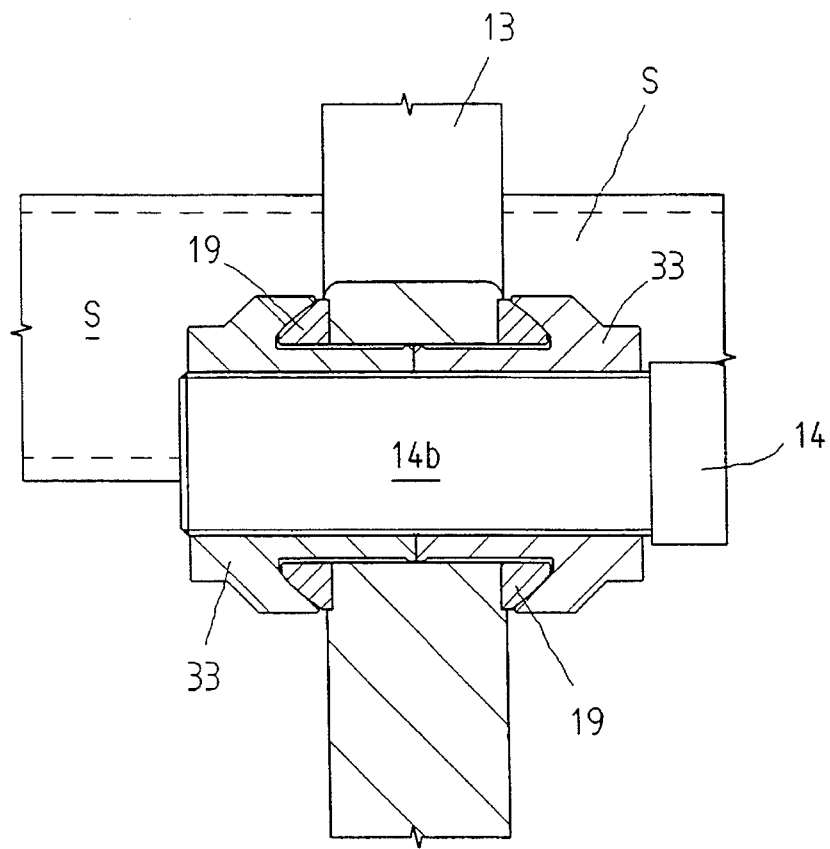
FIG. 5 is an enlarged detail of FIG. 1 in the area of the linked bearing between tension coping and lever.
Figure 5A:
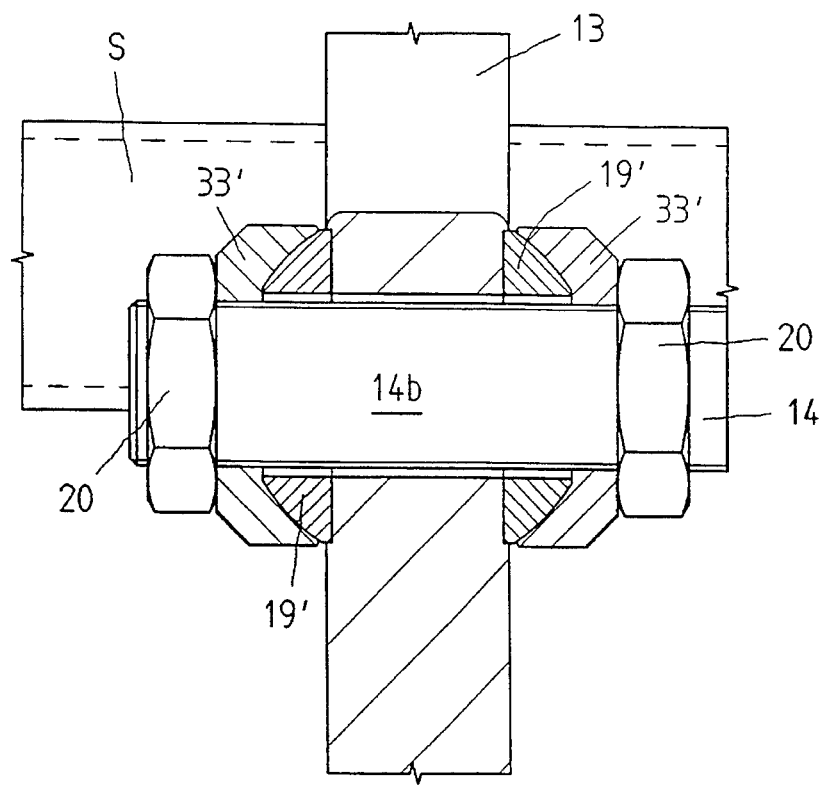
FIG. 5a is an alternative embodiment of the linked bearing of FIG. 5.

FIGS. 5, 5a show the jointed bearing of the tension spars 14. In the embodiment of FIG. 1 the levers 13 are of a flat form. The lever 13 is penetrated by a thread area 14b of the tension spar 14 and spherical segments 19 are fixed by clamping nuts 33, which are in connection with the thread of the tension spars 14, in such a way that they have the same ideal swivelling point. This permits on the one hand the jointed support of the tension spars 14 and on the other hand a plane-parallel adjustment of the stationary and movable mold carriers. An improved fixing method, according to FIG. 5a is achieved by using larger spherical segments 19', which are overlapped by clamping nuts 33' and by additional provision of counter nuts 20 in the thread area 14b of the tension spars 14.

Figure 2:
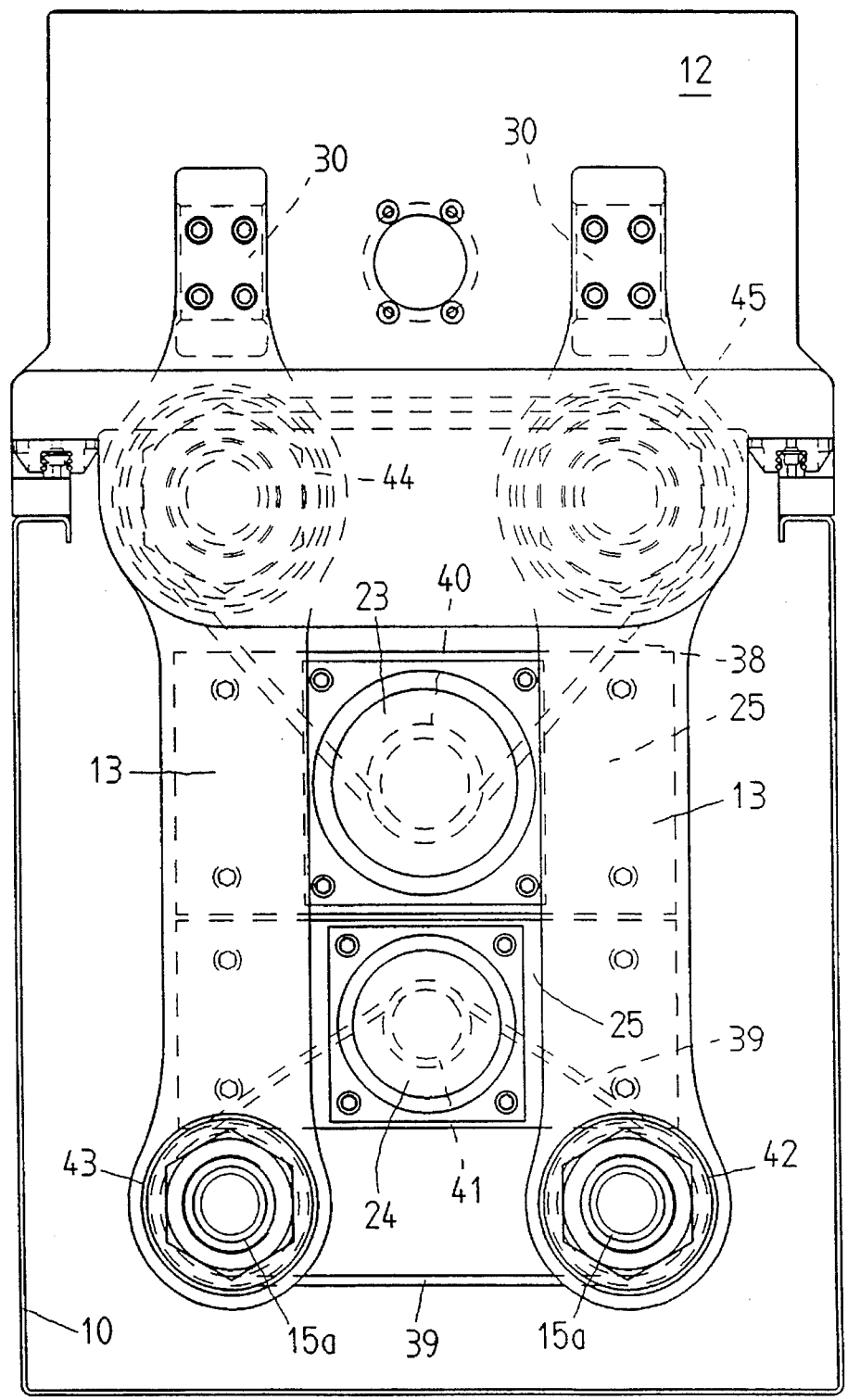
FIG. 2 is a front view from the left side on the injection molding machine shown in FIG. 1 when the casing of the machine base is removed.
Figure 3:
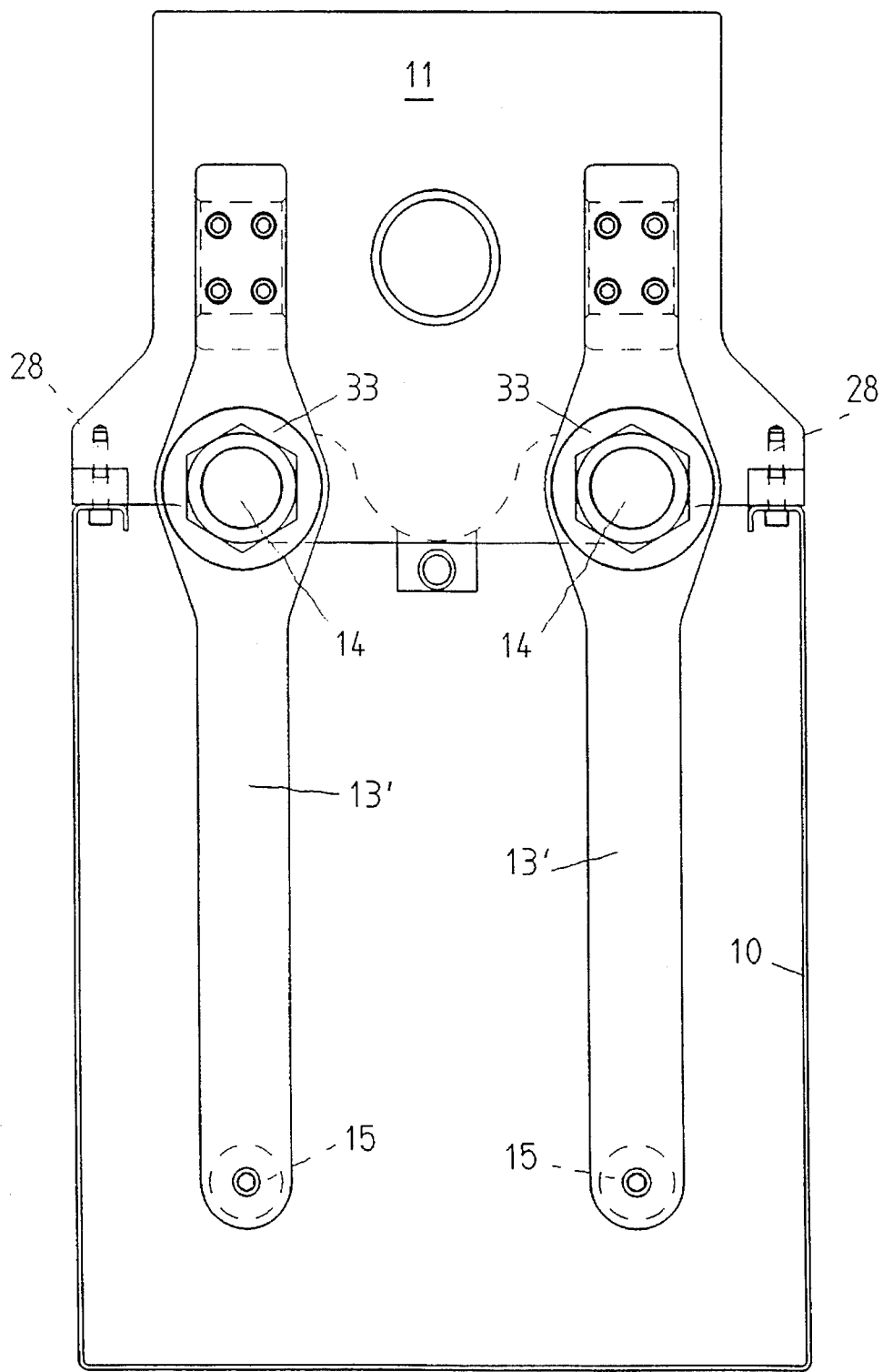
FIG. 3 is a view of the mold closing unit from the direction of the injection molding unit.

In FIGS. 1 and 2 electromechanical drives 23, 24 are provided, in which the function of moving the mold carriers and applying the closing force is, at least partially separated. The drives can also be actuated hydraulically. The tension spars 14 and the pressure spars 15 have spindle areas 14a, 15a. In these spindle areas spindle nuts 21, 22 are rotatable via drives 23, 24. Spindle nuts 21, 22 abut against at least one lever 13. The drive 23 is provided with a drive pulley 40 for actuating a belt 38, which moves the spindle nuts 21 on the tension spars 14 via pulleys 44, 45. The drive 24 is provided with a drive pulley 41, which cooperates with a belt 39, driving two pulleys 42, 43 and connected with spindle nuts 22, which are rotatable on the pressure spars 15. When the movable mold carrier moved to its closed position with the stationary mold carrier, both motors run synchronously, so that both vertical levers 13 together with the bearing points and the drives move in a direction towards the stationary mold carrier 11. However, if the closing force is to be applied, the drive 23 is disconnected and the drive 24, associated to the pressure spars 15, generates the closing force via the lever system. The bearings of both driven spindle nuts are movably supported by spherical roller bearings. According to FIG. 2 the two vertical levers 13 are interconnected by plates 25, which support the motors of the drives 23,24. In another embodiment, however, not represented graphically, it is also feasible that one driving motor moves all four nuts of the tension- and pressure spars by only one toothed belt, and the closing force is lead into the pressure spars for example on the opposite side by a separate drive.

Figure 6:
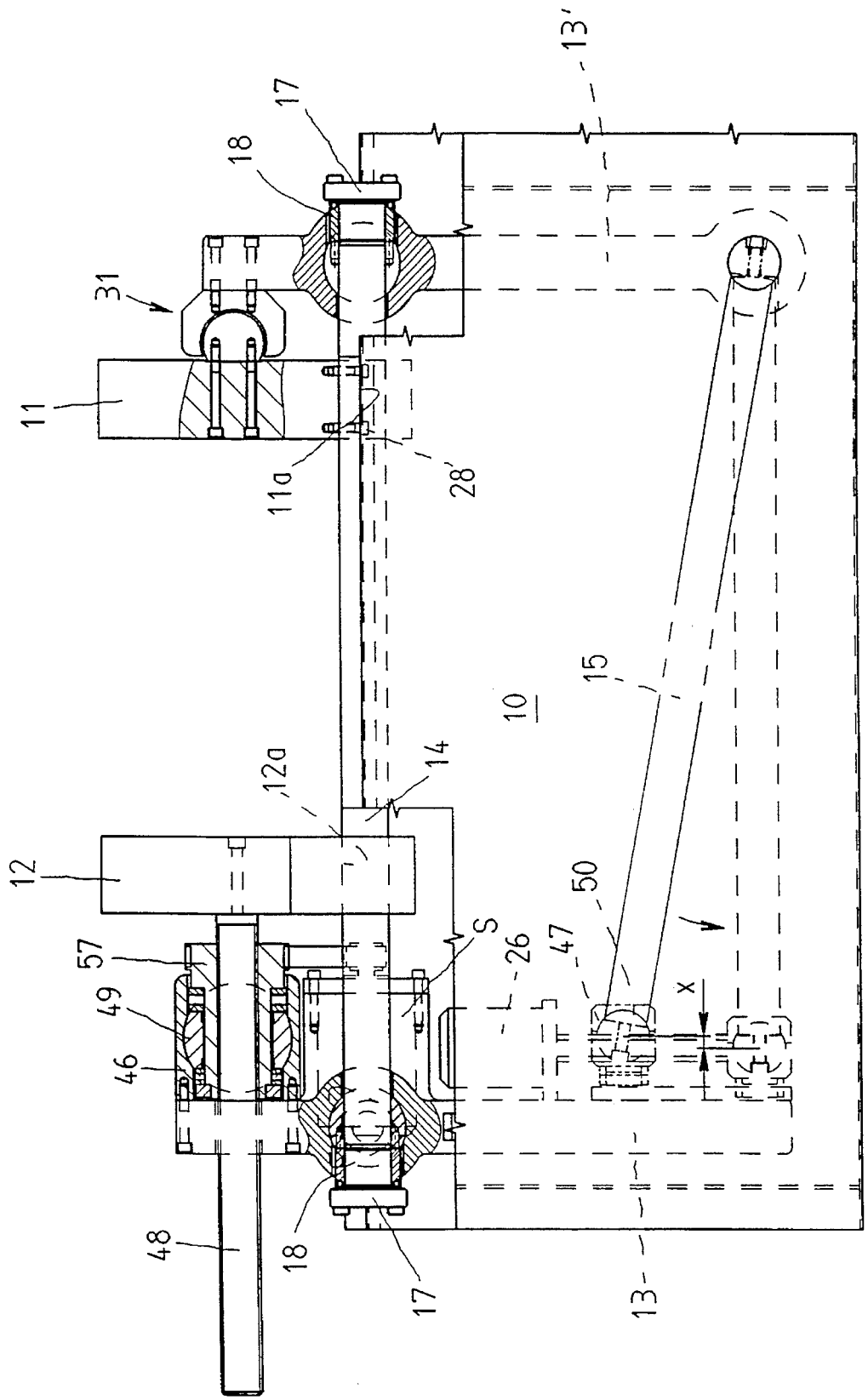
FIG. 6 is a view of the injection molding machine according to FIG. 1 in a further embodiment comprising an electromechanical closing unit.
Figure 7:
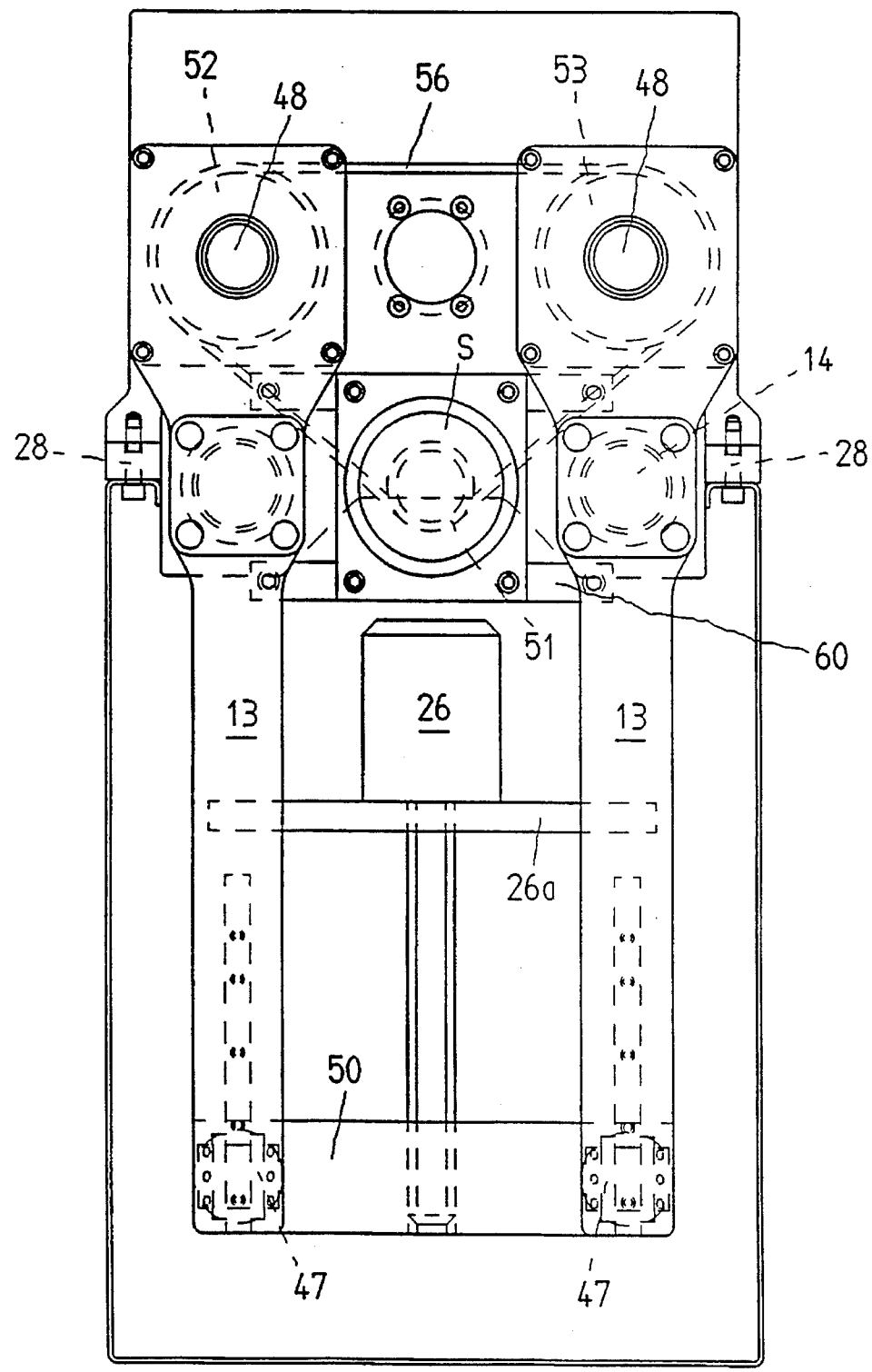
FIG. 7 is a view of the embodiment of FIG. 6 in a representation according to FIG. 2.

FIGS. 6 and 7 show a second embodiment in which, when the movable mold carrier 12 is moved, the masses are reduced since only the movable mold carrier 12 together with the spindle 48 is axially moved. The closing device is located between the tension spars 14 on a bridge 60 and drives the belt 56 via the drive pulley 51 and thus the pulleys 52,53, which move the spindle nut 57. The movable mold carrier 12 in turn is moved by the rotation of the spindle nut 57. The closing force is generated by the drive 26, which is supported at the lever 13. The second drive 26 is provided with a pressure bar 50, at which the pressure spars 15 are bedded in bearings 47. When the pressure bar 50 is moved by the second drive 26, the pressure spars 15 are transfered from an inclined position into a horizontal position, generating a stroke x, which leads to a larger distance between the levers 13,13' in the area of the pressure spars 15. The closing force is generated because of the jointed bearing in the area of the pressure spars 15, in the course of which the pressure spars 15 are transfered in direction of the arrow. The arrangement can be realized on both sides. If the pressure spars 15 are in their horizontal position, the maximum closing force is achieved. According to FIG. 7, the second drive 26 is supported between the two levers 13 by a bearing plate 26a.

Figure 8:
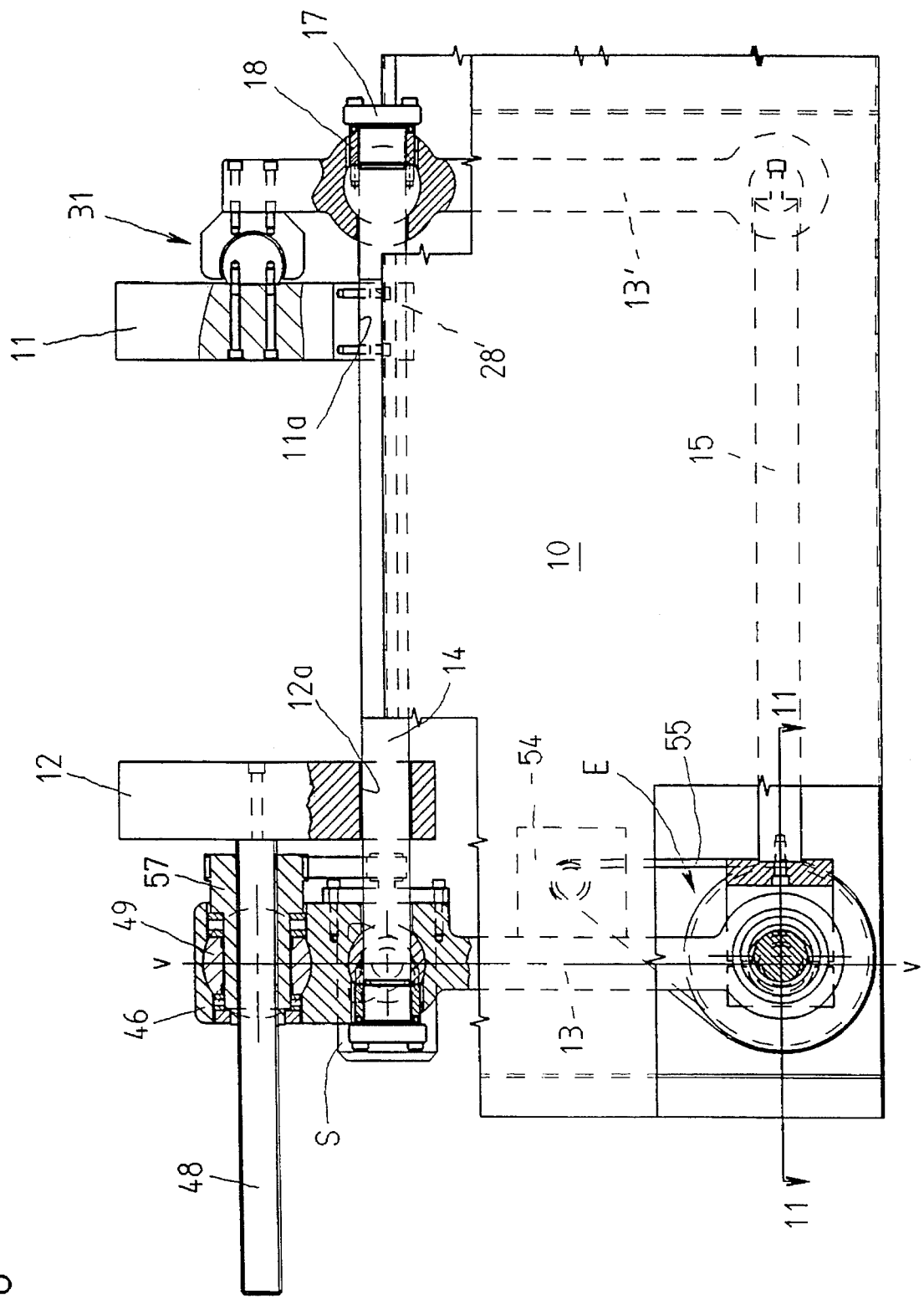
FIG. 8 is a view of the injection molding machine according to FIG. 1 in a third embodiment with an eccentric adjustment.
Figure 9:
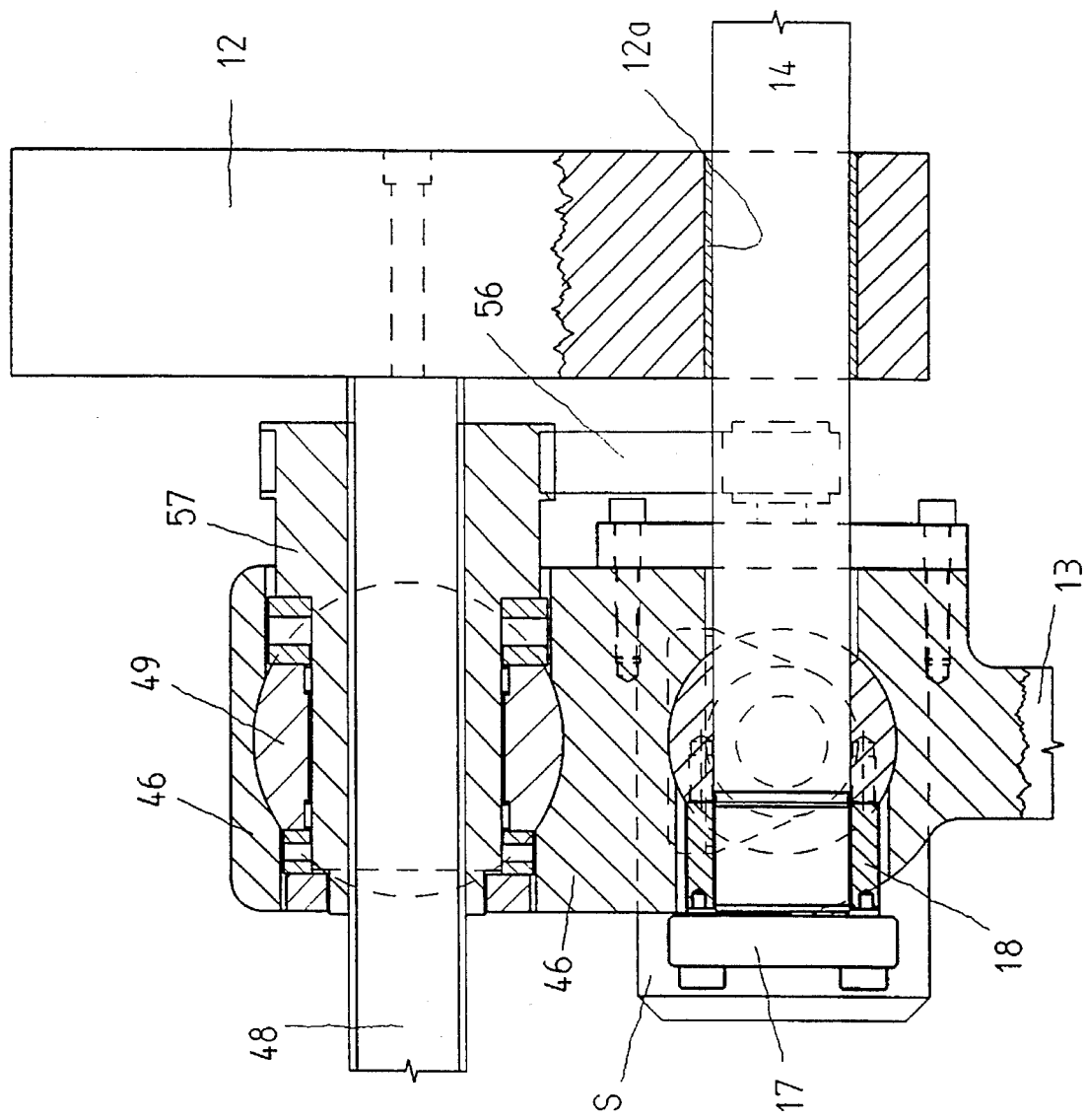
FIG. 9 is an enlarged detail of FIG. 8 in the area of the linked bearing of the movable mold carrier.
Figure 10:
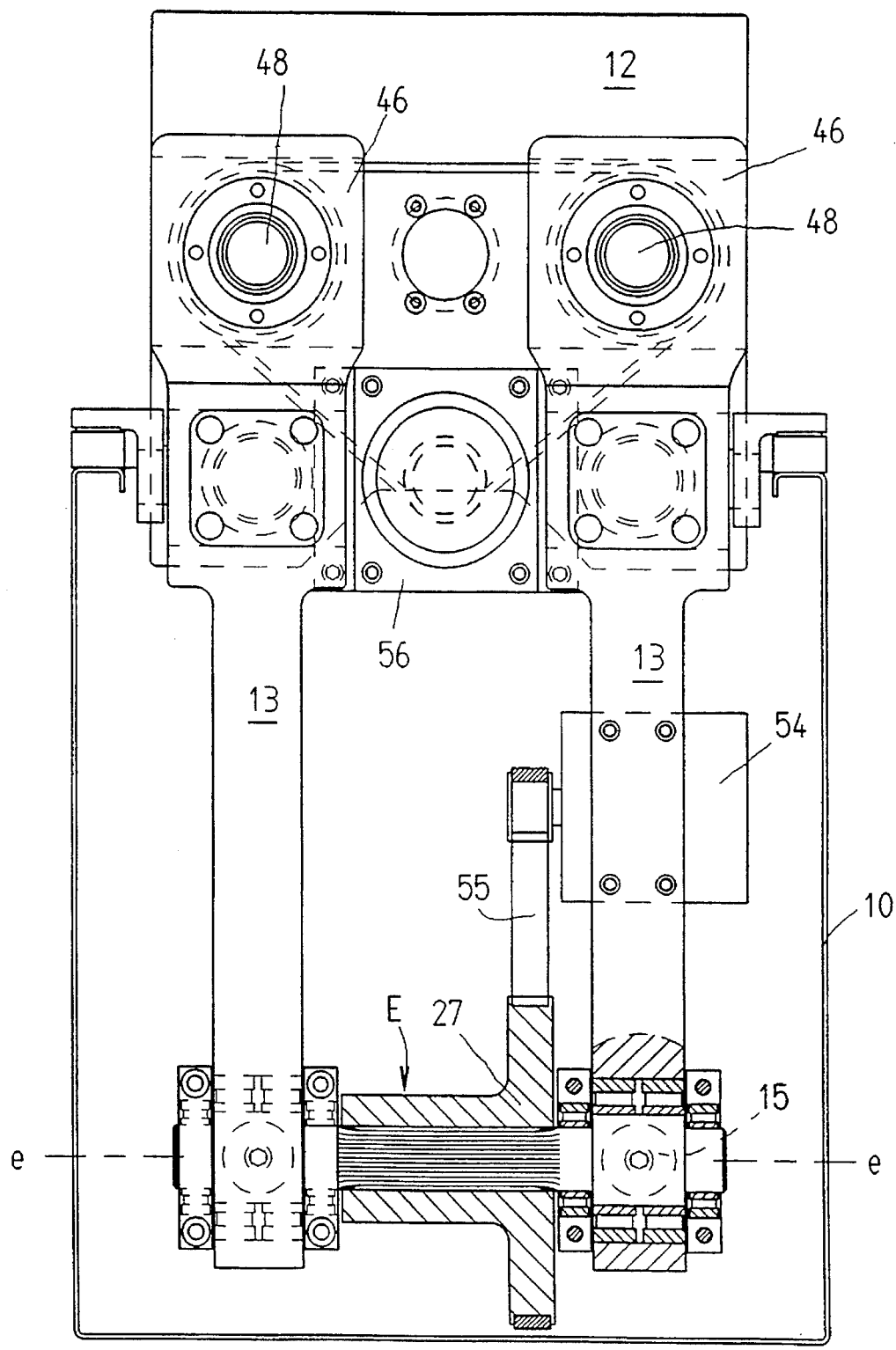
FIG. 10 is a view of the injection molding machine according to FIG. 8 in a representation according to FIG. 2.
Figure 11:
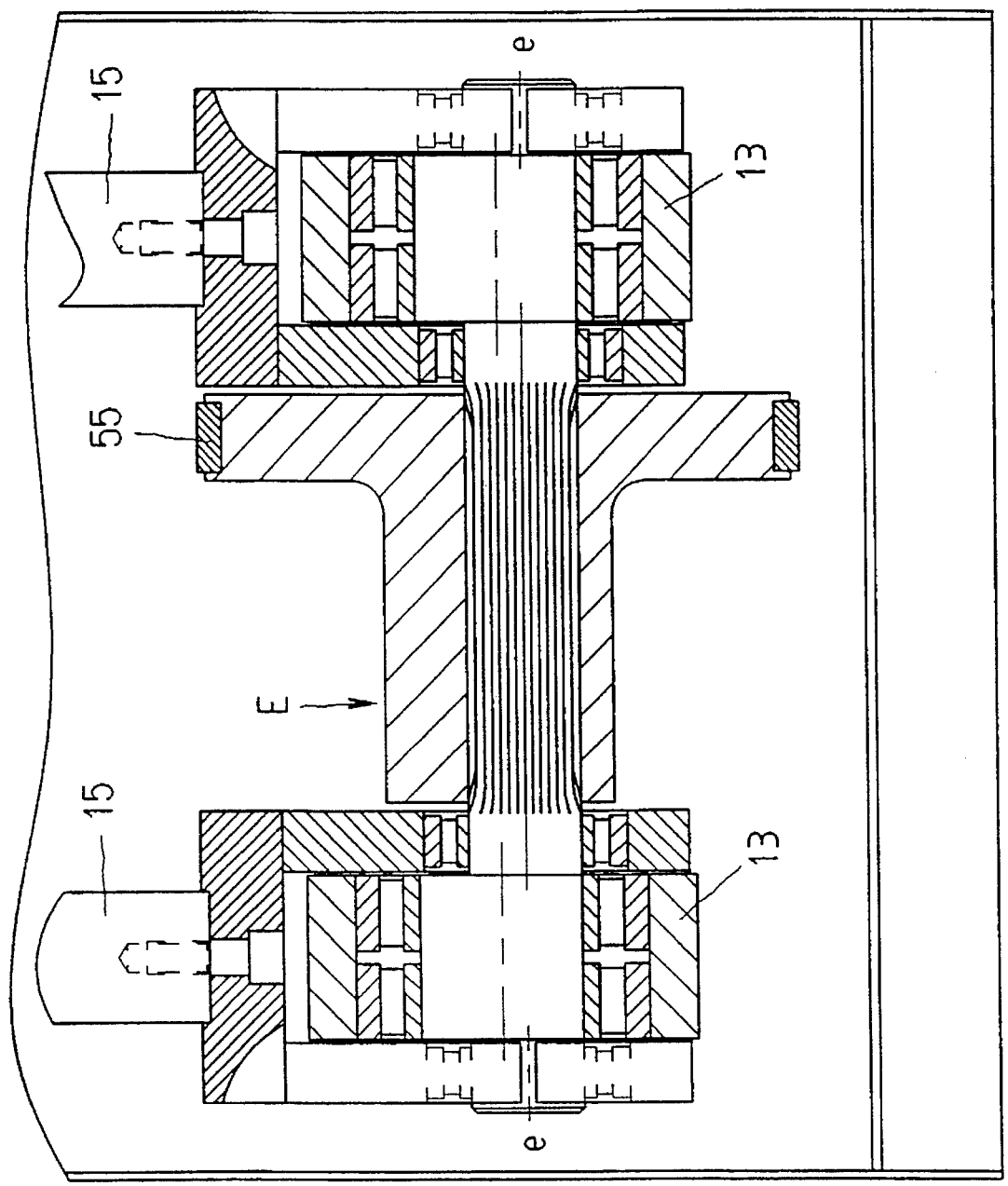
FIG. 11 is a sectional view according to lines 11—11 of FIG. 8.
Figure 12:
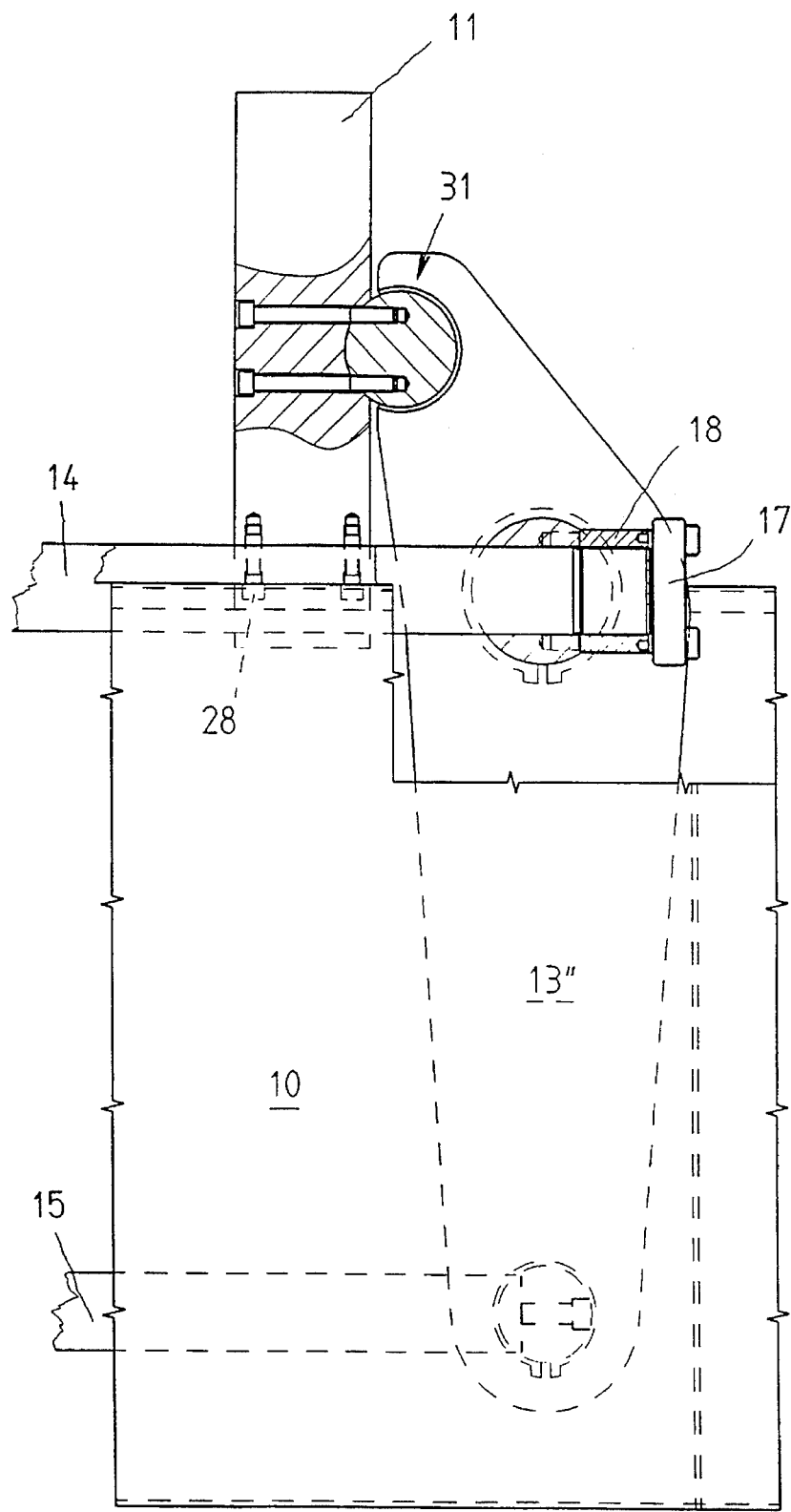
FIG. 12 is an enlarged detail through an injection molding machine in a view according to FIG. 1 in the area of the levers in a fourth embodiment.
Figure 13:
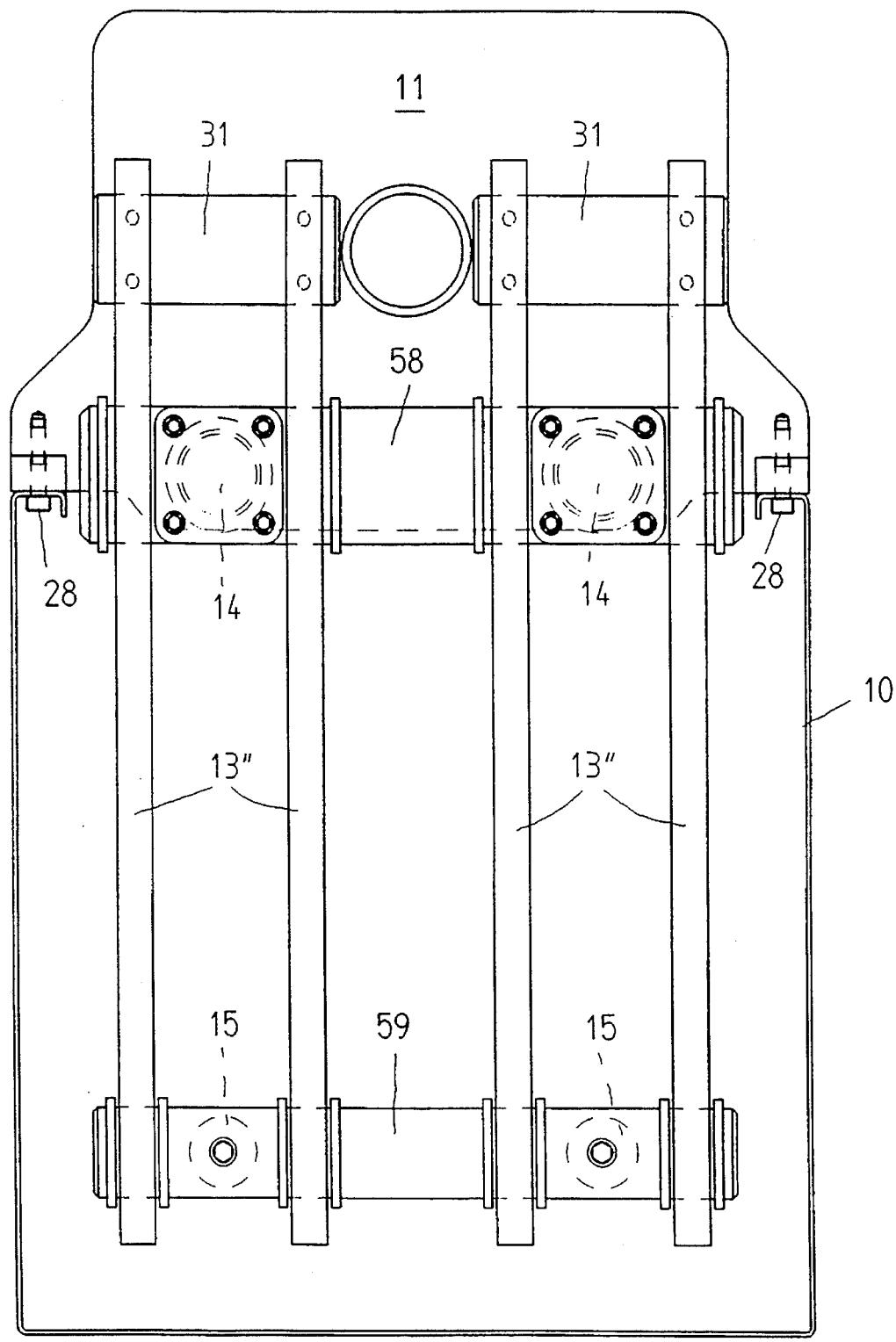
FIG. 13 is a view of the detail according to FIG. 12 seen from the injection molding unit.

In FIG. 8 the applied of the closing force by an eccentric E is represented in a third embodiment. The eccentric E is driven by a third drive 54 and a belt 55. From FIGS. 10 and 11 it can be seen, that the eccentric E extends distances from axis e—e. For that reason, when the eccentric E is moved by the third drive 54, the closing forces are generated. The bearing points of the eccentric E, the tension spars 14 and the spindle 48 lie in a vertical axis v—v, so that horizontal misalignements are negligible when the lever 13 is in an inclined position. The displacement of the movable mold carrier 12 is effected as in the second embodiment and FIG. 9 shows the respective jointed bearing of the spindle 48. The closing unit drives the spindle nut 57 via a belt 56, which spindle nut 57 is rotatably supported in a joint 49. The joint 49 in turn is supported in a housing 46, constituting a part of the lever 13, but it also can be screwed to the vertical levers 13. Such an arrangement allows for compensation of an inclined position of the vertical levers. According to the forth embodiment represented in the FIGS. 12 and 13 the levers 13" are not only arranged flat and transversally with respect to the closing direction, but also as burning blanks in the closing direction. The dimensioning of the burning blanks is made in accordance with the maximum moment load, whereby jointed bearings can be provided for the tension spars 14 and the pressure spars 15. If required, it is possible to arrange several levers, in FIG. 13 for example four levers 13", which are penetrated by bearing studs 58, 59.

Instead of the two spindles 48 for displacement of the movable mold carrier 12 it is also possible to provide only one spindle, however, in most cases it is then necessary to increase the size of the guidance and the supporting surface of the movable mold carrier 12. However, the enlargement of the supporting surface is also required, if the ejector has to be arranged, in this case in line with the spindle 48, whereas otherwise it can be arranged between the two spindles.

Figure 14:
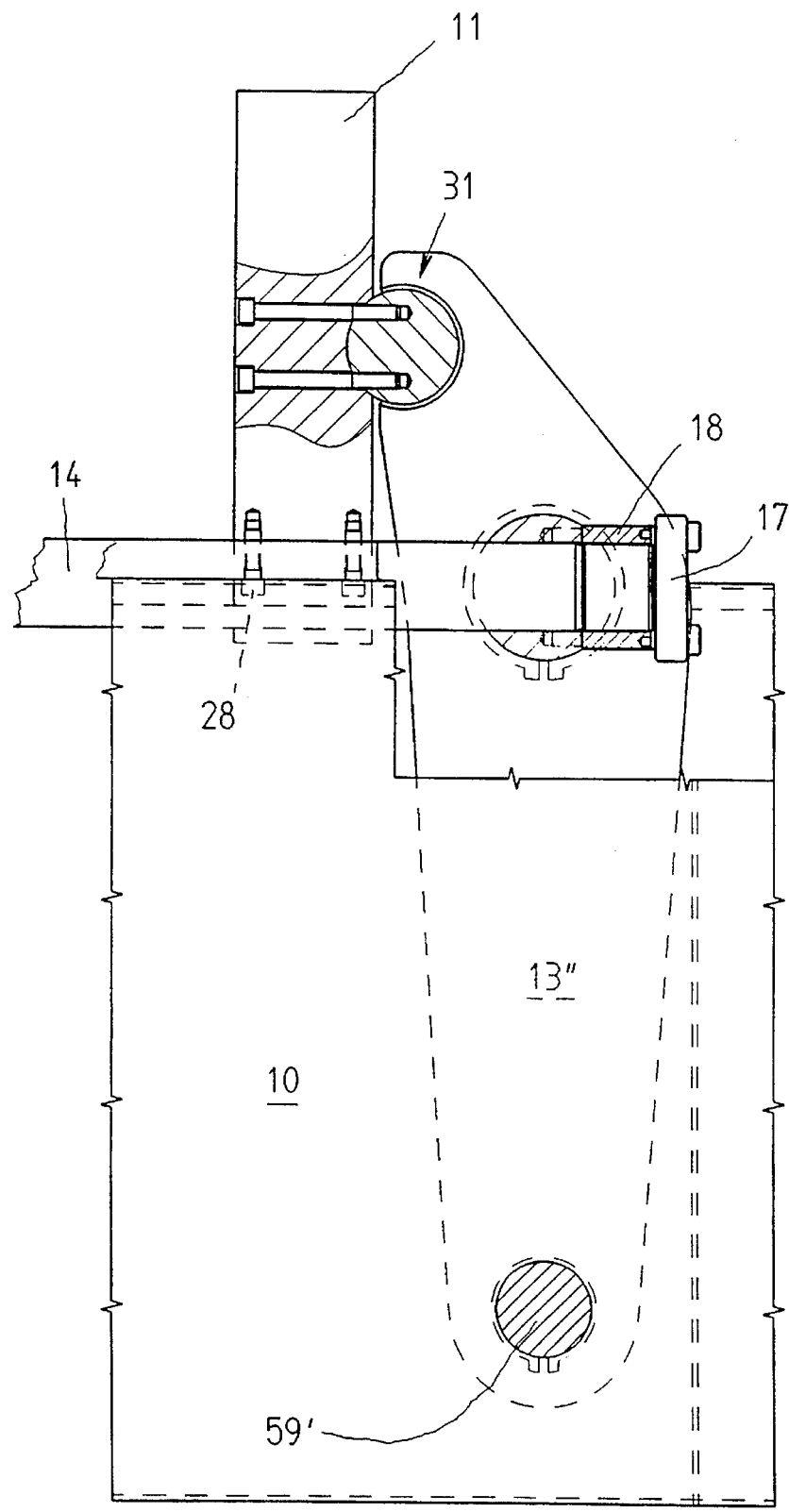
FIG. 14 is a representation according to FIG. 12 wherein the machine base is applied as a joining element.
Figure 15:
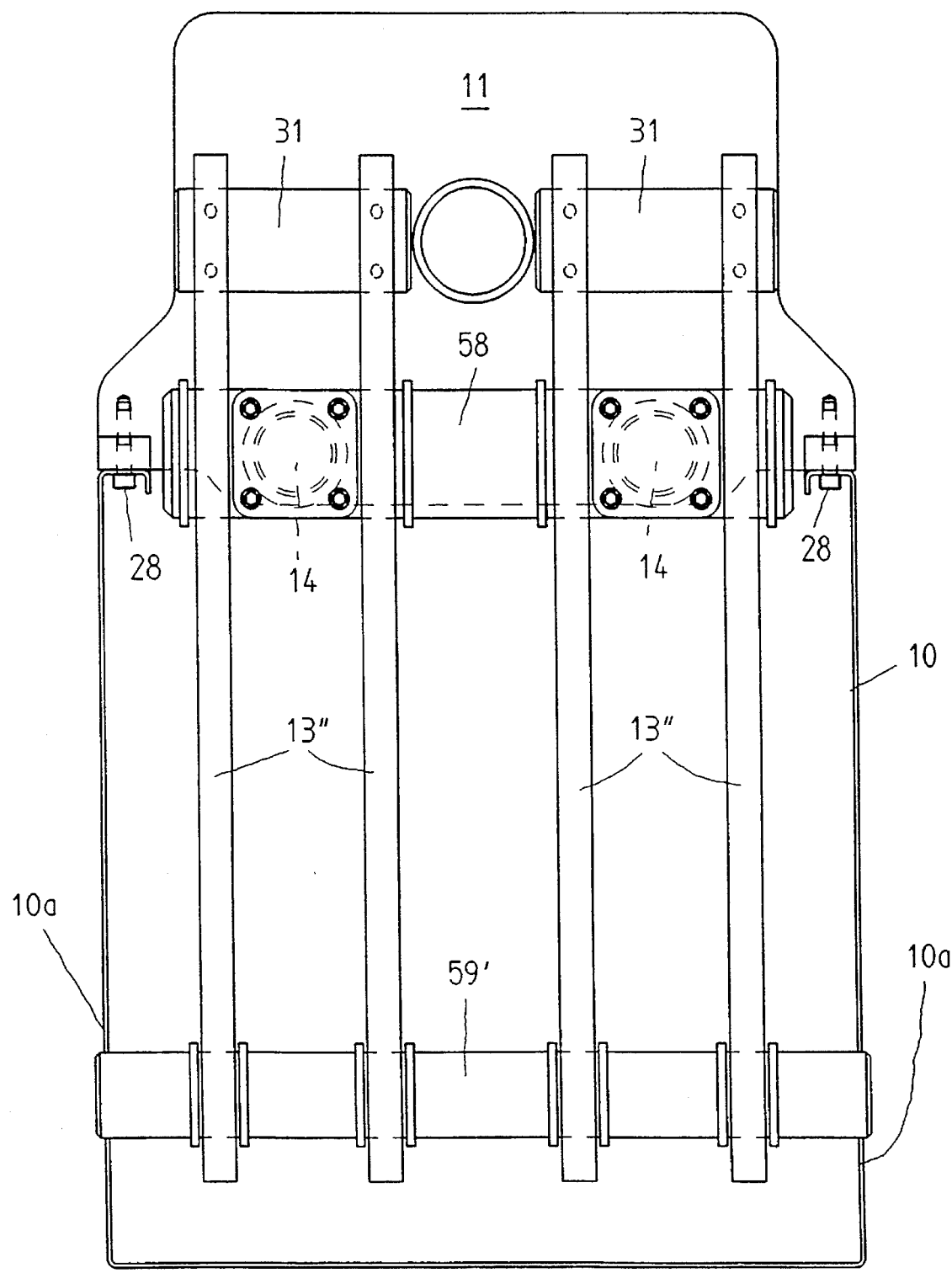
FIG. 15 is a view of the detail according to FIG. 12 seen from the injection molding unit.

In the first four embodiments shown in the FIGS. 1-13, the mold closing unit is fixedly connected with the machine base 10 only at one spot respectively. In the fifth and sixth embodiment in comparison the machine base 10 is used as a second connecting means. The levers 13',61,61' are interconnected by a tension spar 14, the machine base 10, however, is applied as "pressure spar". Consequently, in these two embodiments the machine base 10 is the joining element located at an increased distance from the injection axis a—a, the levers being in contact with the bearing elements, which are connected with the machine base 10. FIG. 14 is a representation similar to that shown in FIG. 12, differing from the forth embodiment in that the bearing stud 59' simply is extended towards the outside and is supported in penetration orifices 10a of the machine base 10. In the embodiment shown in FIG. 16 however, the levers 61, 61' are loosly inserted into a pair of guides 62, 62', which serve as bearing element and are fixed at the machine base 10. In both cases the closing device S is coupled directly in the area of the movable mold carrier 12 by a supporting element 16. This execution has the disadvantage that the deformations act upon the machine base. Though the loading takes place at such a distance from the mold closing unit that an influence can largely be avoided. In any case the closing device S supports itself at the force framing, and preferably at the straight connections between the connection points of the levers and the connecting means or in the area of the movable mold carrier 12. Since, however, the essential forces are introduced in this area, no or only little deformations act upon the machine base. All embodiments have in common, that an actual (FIGS. 1–13) or an ideal (FIGS. 14–16) force framing is created, which disposes of tensioning- and pressure elements adapted to deviate the forces occuring outside the mold clamping space.

Figure 17:
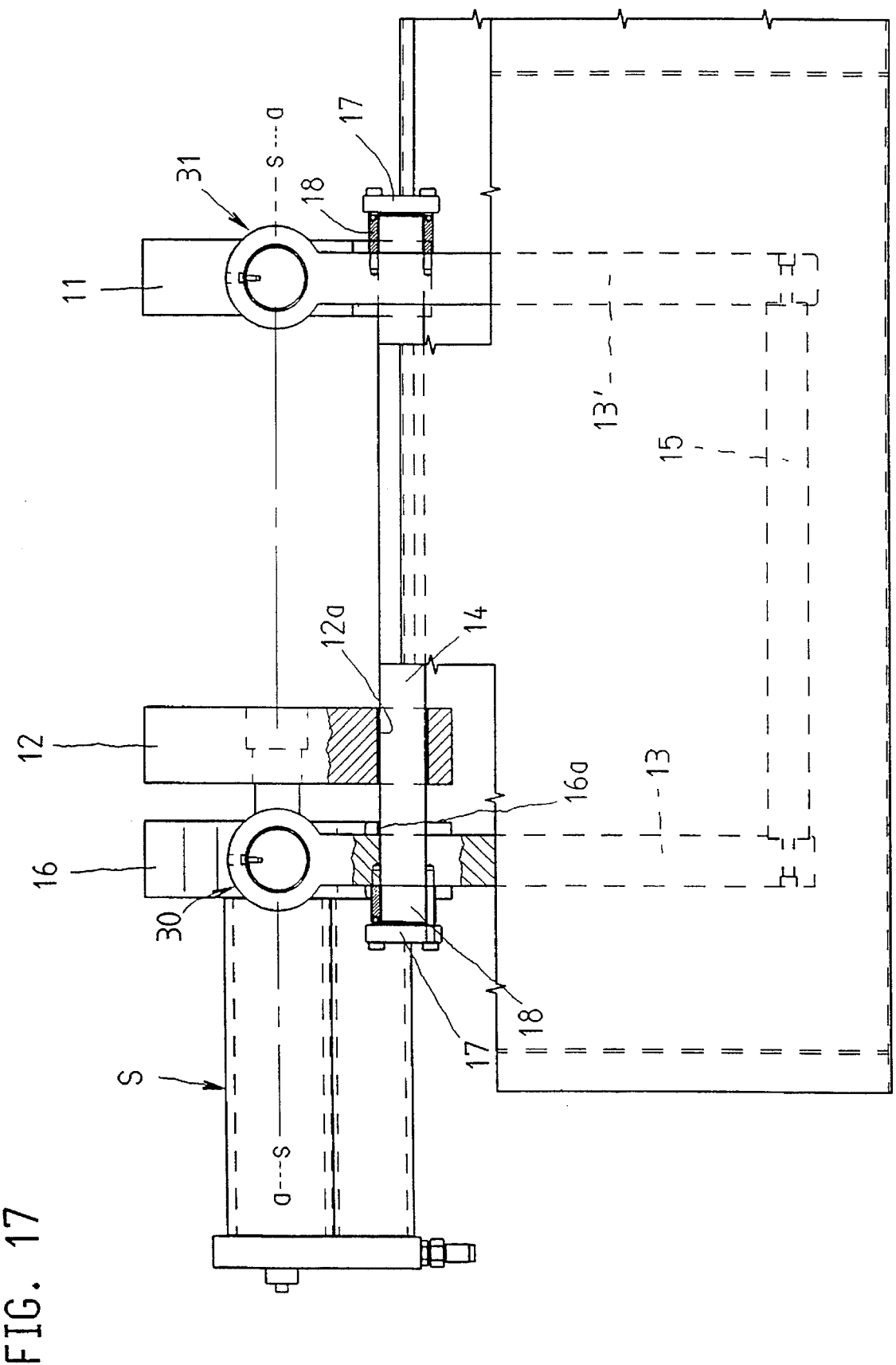
FIG. 17 shows the mold closing unit of the injection molding machine in a sixth embodiment, wherein the levers are coupled in a center plane of the supporting element and the mold carrier.

Finally, FIG. 17 represents an embodiment, in which the joints 30, 31 are coupled directly, laterally at the supporting element 16 and the stationary mold carrier 11. The closing axis a—a and straight lines laid through the coupling points basically intersect in the center of the supporting element 16 and the stationary mold carrier 11, respectively. This way the deformations occuring can be further reduced and the whole force transmitting mechanism can be of a shorter dimension.

I claim:

1. An injection molding machine for processing synthetic materials comprising:

a stationary mold carrier;

a movable mold carrier defining with said stationary mold carrier a mold clamping space located between said movable mold carrier and said stationary mold carrier, said mold clamping space receiving a mold; said movable mold carrier being movable in a closing direction along a closing axis toward said stationary mold carrier to a closed position;

force transmitting means for connecting said stationary mold carrier with said movable mold carrier and comprising at least two levers arranged substantially transverse to the closing direction;

a first connector arranged at a first distance from the closing axis, said first connector being laid through coupling points of said levers and extending substantially parallel with said closing axis;

a second connector arranged at a second distance from the closing axis, the second distance differing from the first distance; whereby said at least two levers, said first connector and said second connector collectively form a movable frame;

a force applying device for applying a required closing force at an upper portion of said at least two levers in a region of said movable mold carrier, said force applying device causing a lower portion of at least one of said levers to move, whereby an angle ratio between said first connector and said at least one of said levers, and between said second connector and said one of said levers is modified; and a closing device supported by said frame and connected to said movable mold carrier for transferring said movable mold carrier in and out of the closed position.

2. An injection molding machine as defined in claim 1, wherein said first connector comprises a first spar being under tension when the closing force is applied; said second connector comprises a second spar being under pressure when the closing force is applied; and said force applying device being located in an area of coupling between said second spar and one of said two levers and being electromechanically driven.

3. An injection molding machine as defined in claim 1, wherein said force applying device includes at least one spindle nut rotatable by a driving device and cooperating with a spindle area of at least one of said first and second connectors, said at least one spindle nut abutting against at least one of said levers.

4. An injection molding machine as defined in claim 2, wherein said closing device comprises a first spindle nut located on said first spar and a second spindle nut located on said second spar, each being activated together for transferring said movable mold carrier in and out of the closed position, and said force applying device comprises a motor arranged at said second spar and activating only the spindle nut located on said second spar for applying the closing force.

5. An injection molding machine as defined in claim 2, wherein said force applying device comprises a driving device connected to said second spar and being activated to transfer said second spar from an inclined position to a horizontal clamping position.

6. An injection molding machine as defined in claim 2, wherein said force applying device comprises an eccentric member supporting said second spar at said one of said levers.

7. An injection molding machine as defined in claim 6, wherein said closing device comprises a spindle attached to said movable mold carrier; said eccentric member, said first spar and said spindle each being supported at respective bearing locations lying substantially along a vertical axis.

8. An injection molding machine as defined in claim 2, wherein said levers are flat, and said first spar includes a jointed bearing comprising two spherical segments mounted on a respective lever, said spherical segments having the same swivelling point.

9. An injection molding machine for processing synthetic materials, comprising:

a stationary mold carrier;

a movable mold carrier defining with said stationary mold carrier a mold clamping space located between said movable mold carrier and said stationary mold carrier, said mold clamping space receiving a mold, said movable mold carrier being movable in a closing direction along a closing axis toward said stationary mold carrier to a closed position;

force transmitting means for connecting said stationary mold carrier with said movable mold carrier and comprising at least two levers arranged substantially transverse to the closing direction;

a first connector arranged at a first distance from the closing axis, said first connector being laid through coupling points of said levers and extending substantially parallel with the closing axis;

a second connector arranged at a second distance from the closing axis, the second distance differing from the first distance; whereby said at least two levers, said first connector and said second connector collectively form a frame;

a supporting element connected to said movable mold carrier;

a first joint connecting said supporting element to one of said two levers, and comprising a plurality of first joint parts each being detachable and exchangeable;

a second joint connecting said stationary mold carrier to the other one of said two levers, and comprising a plurality of second joint parts each being detachable and exchangeable; and a closing device for applying a required closing force and being supported by said frame and coupled to said supporting element for transferring said movable mold carrier in and out of the closed position.

10. An injection molding machine as defined in claim 9, wherein said second connector comprises a machine base; further comprising a respective bearing stud coupling a respective lever to said machine base, said bearing studs being supported in penetration orifices located within said machine base.

11. An injection molding machine as defined in claim 9, wherein said second connector comprises a machine base; further comprising a respective guide fixed to said machine base, each respective lever being loosely inserted into and supported by the respective guide.

12. An injection molding machine as defined in claim 9, further comprising washer pieces insertable between the respective joints and said levers for changing a distance between said movable mold carrier and said stationary mold carrier.

13. An injection molding machine as defined in claim 9, further comprising a washer piece insertable between the second joint and said stationary mold carrier for changing a distance between said movable mold carrier and said stationary mold carrier.

14. An injection molding machine as defined in claim 9, further comprising a washer piece insertable between the first joint and said supporting element for changing a distance between said movable mold carrier and said stationary mold carrier.

* * * * *